Sept. 13, 1927.
J. HANSEN
1,642,582
FISHING AND HUNTING OTTER
Filed Feb. 4, 1927
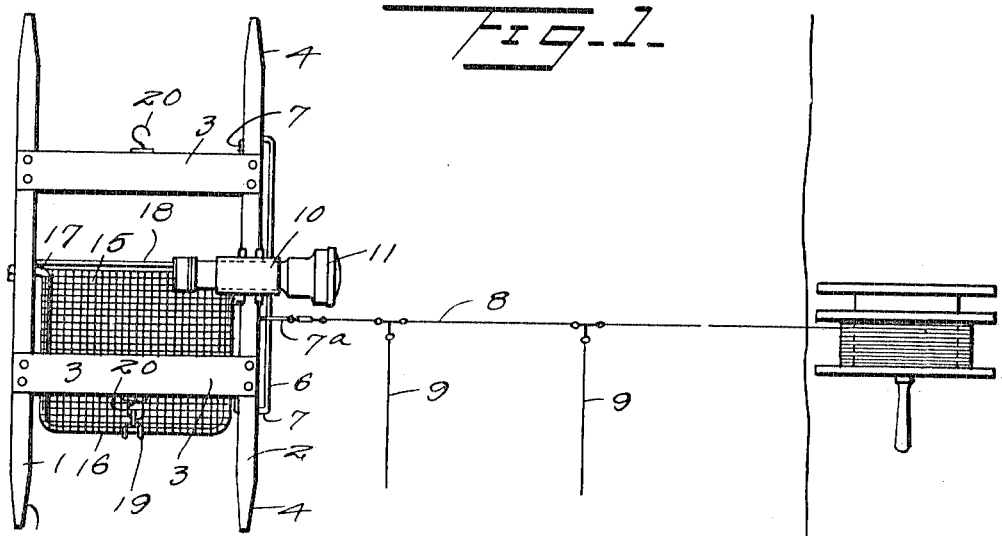
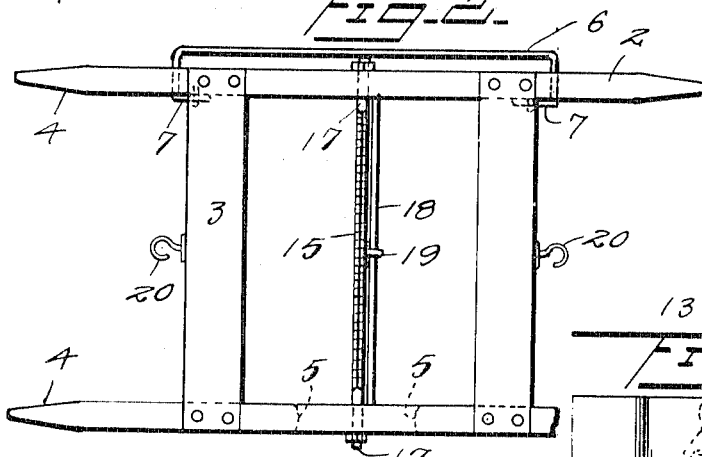
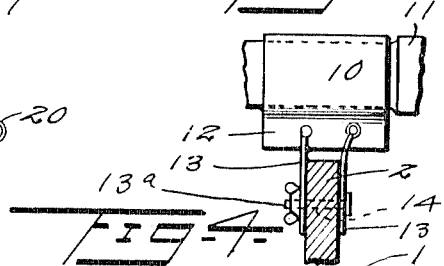
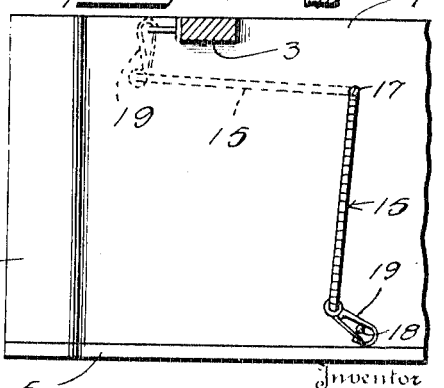
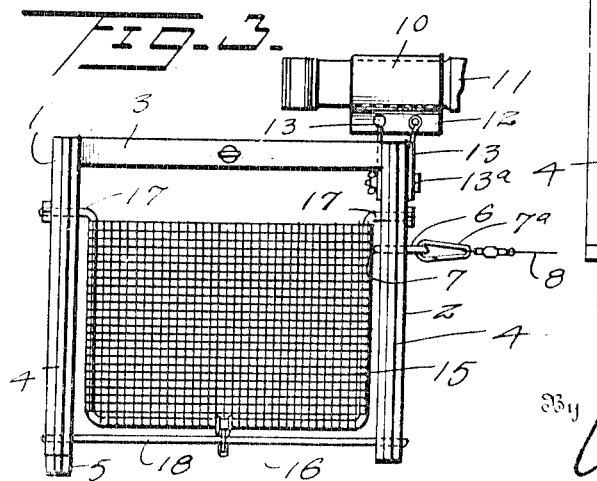
Inventor
J. Hansen
By
Attorney Patented Sept. 13, 1927.

1,642,582

UNITED STATES PATENT OFFICE.

JOHN HANSEN, OF MILLTOWN, MONTANA.

FISHING AND HUNTING OTTER.

Application filed February 4, 1927. Serial No. 165,893.

The invention relates to otters used in trolling for fish, and has for its principal object the provision of improvements in the construction of the otter itself to make it more easily controlled, and also attachments to the otter by which the device is adapted to be used for trolling at night.

A further object of the invention is the provision of an attachment to the otter by which it may be used for retrieving birds over bodies of water while ducking.

The invention will be described in detail hereinafter and will be found illustrated in the accompanying drawings, in which Figure 1 is a plan view showing the otter in operation, Figure 2 is a plan view of the otter on an enlarged scale, Figure 3 is an end view, Figure 4 is a longitudinal sectional view showing the screen frame in a lowered position in full lines for retrieving game, and in raised position in broken lines when the device is used for fishing, and Figure 5 is a side view of the lamp and bracket secured to the device, shown fragmentally.

In the drawings similar reference characters will be used to designate corresponding parts in the several views.

The otter comprises two substantially parallel plates, designated 1 and 2, respectively, said plates being of a buoyant nature, and preferably made of wood planks. The two plates are spaced apart by means of cross pieces 3 connecting their upper edges, and the plates 1 and 2 have their two ends tapered as shown at 4. The under edge of the plate 1 has weights 5 secured thereto, said weights being adapted to cant the otter when in the water, slightly, and also act to ballast the device to make it more easily steered when in operation as will be hereinafter referred to. The outer side of the plate 2 has a rod 6 with is end turned as shown at 7 to secure the rod to the plate and to space the longitudinal portion thereof from the side of the plate.

The device hereinbefore described may be used for fishing by daylight, the fishing line being secured to the rod 6 by means of a loop member 7ª secured to the end of the line 8, and said line has attached thereto one or more leaders 9 to which the fishing hooks may be attached. The leaders for fishing near the surface are not weighted, but when it is desired to fish under the surface weights may be attached to the leaders to sink them to any depth desired by the fisherman.

In operating the device the otter is placed in the water and the fisherman if on shore walks along the bank of the stream or lake and the otter will move in the same direction as that taken by the fisherman and will gradually move farther and farther from the shore, the fishing line being played out by the fisherman as the otter moves out from the shore, the loop 7ª engaging the rod 6 adjacent to the forward end of the frame of the otter. Should it be desired to reverse the direction of the movement of the otter, the line 8 will be slackened and the momentum of the otter will carry it forward so that the loop will engage the other end of the rod 6 and then by moving in a reverse direction the otter will be actuated in the same direction and may be allowed to go farther from the shore if desired by the fisherman.

It will be apparent that if desired the otter may be used for fishing from a boat instead of from the shore as heretofore described, the same operation taking place and the same manipulation of the otter being accomplished.

For night fishing it is necessary to provide a light to attract the fish to the bait, and for this purpose the means for securing a conventional flash light has been provided and comprises a sleeve 10 adapted to enclose and be secured to the flash light casing, the flash light being designated 11, and pivotally secured to a flange 12 on the sleeve 10 are plates 13, that are spaced to engage on the two sides of plate 2, and secured thereto by means of a bolt 13ª engaging through an opening 14 in said plate.

The otter is also adapted to be used for retrieving ducks or other birds while hunting, and for this purpose a screen frame 15 has been provided having a U-shaped member 16 with laterally extending trunnions 17 that are pivotally engaged with the planks 1 and 2. A rod is also provided and secured to the plates 1 and 2, said rod being designated 18 and engaging the planks adjacent to their lower edges and serves to brace and space the lower edges of the plates. A snap hook 19 is carried by the lower portion of the U-shaped member 16, and engages the rod 18 when the device is used for retrieving game, to hold the screen frame 15 in upright position between the plates. Hooks are provided on the outer edges of the cross pieces 3 to which the snap hook 19 may be selectively attached when the otter is used for fishing, said hooks being designated 20.

It will be apparent that when the device is used for retrieving game the otter will be manipulated by a line as in fishing to move it so that the birds will be engaged between the plates 1 and 2 and against the screen frame 15 and the otter may then be pulled into shore.

What is claimed is:—

1. A fishing and hunting otter, comprising a buoyant frame including spaced plates, one of said plates having its under edge weighted to cant the frame, and means to connect a line to said frame.

2. A fishing and hunting otter, comprising a buoyant frame including spaced plates having tapered ends, one of said plates having its under edge weighted to cant the frame, and a rod on the outer side of the unweighted plate to engage a line for operating the frame.

3. A fishing and hunting otter, comprising a buoyant frame including spaced plates, one of said plates having its under edge weighted to cant the frame, a screen frame arranged between the spaced plates, and means to slidably connect a line to the frame.

4. A fishing and hunting otter, comprising a buoyant frame including spaced plates, one of said plates having its under edge weighted to cant the frame, a screen frame pivotally mounted between the plates and extending transversely of the frame, means to hold said screen frame in adjusted positions, and a rod on the outer side of the unweighted plate to engage a line for operating the frame.

5. A fishing and hunting otter, comprising a buoyant frame including spaced plates, one of said plates having its under edge weighted to cant the frame, a rod on the outer side of the unweighted plate, a line slidably engaging the rod for operating the frame, said line having fishing line leaders connected therewith, and a lamp carried by the frame to illuminate the line and leaders.

6. A fishing and hunting otter, comprising a buoyant frame including spaced parallel plates, one of said plates having its under edge weighted to cant the frame, a rod secured to the unweighted plate, each of said plates having their ends tapered, a line slidably engaging said rod, a screen frame pivotally engaging between the plates, means to secure the screen frame in upright position between the plates and in a substantially horizontal position.

In testimony whereof I affix my signature.

JOHN HANSEN.